United States Patent Office 3,149,335
Patented Sept. 15, 1964

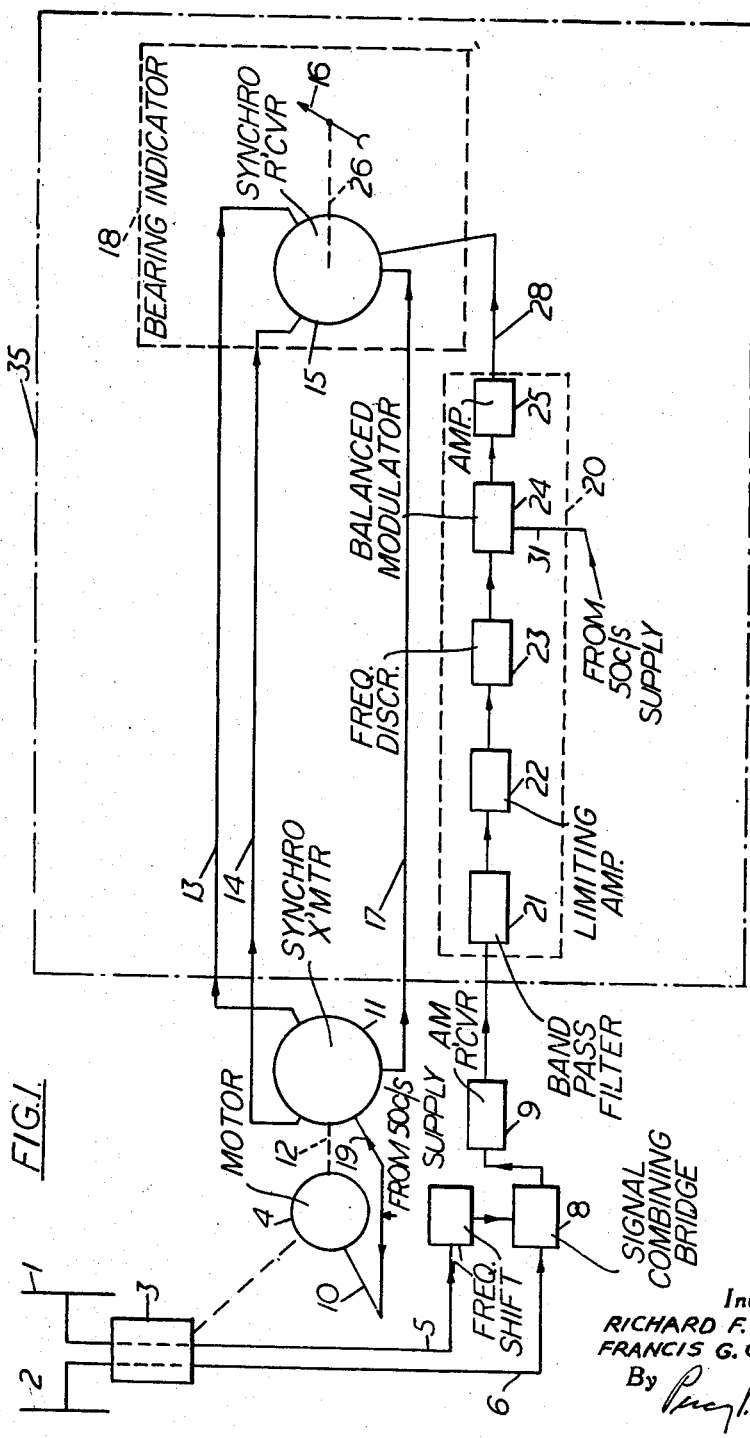

3,149,335
RADIO NAVIGATION RECEIVER ARRANGEMENT
Richard Francis Cleaver and Francis Geoffrey Cockerill, London, England, assignors to International Standard Electric Corporation, New York, N.Y., a corporation of Delaware
Filed July 11, 1962, Ser. No. 209,017
Claims priority, application Great Britain Sept. 1, 1961
3 Claims. (Cl. 343—113)

This invention relates to radio navigation receiver arrangements in which it is desired to determine the phase relationship between a particular wave train, hereinafter referred to as the "signal wave" and a wave train of predetermined phase, hereinafter referred to as the "reference wave." Such radio navigation receiver arrangements have particular application in radio direction finding receivers, and radio beacon receivers, although the invention is not limited in its application to use in such receivers.

A number of means for indicating the relative phase angle between two wave trains is known. It is essential that the electrical systems associated with such means do not introduce a spurious phase shift of either the signal or reference waves. The "reference wave" is often of sufficient amplitude to be applied directly to the phase angle indicator. In many known systems, however, the "signal wave" has to be amplified before comparison with the reference wave, and it has been necessary in such systems to ensure that any phase shift introduced in the amplifier stages or coupling networks is allowed for and furthermore remains constant.

This problem of spurious phase shift of the signal wave arises particularly in the types of radio direction finding or radio beacon receiver systems, where a signal wave of the order of, say, 3 c./s., is required to be amplified before application to the bearing resolution and indicating circuits.

The present invention provides a receiver arrangement in which these problems of phase shift in the receiver are minimised.

According to the present invention there is provided a radio navigation receiver arrangement including a first modulator to modulate the amplitude of a carrier wave by a reference wave in such a way that a first amplitude modulated wave is produced substantially free from the carrier frequency component, a second modulator to modulate the amplitude of a second carrier wave of the same frequency as the first carrier wave by a bearing signal wave in such a way that a second amplitude modulated wave is produced substantially free from the carrier frequency component, circuit means to apply the first and second amplitude modulated waves to a bearing indicator responsive to the phase difference between the reference and bearing signal waves.

Figure 2A:
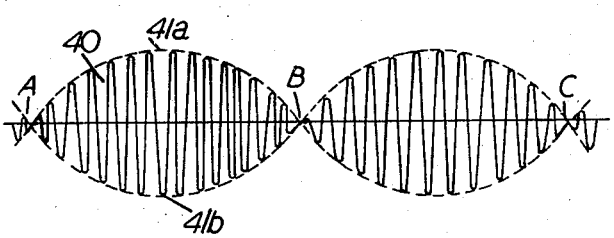
Figure 2B:
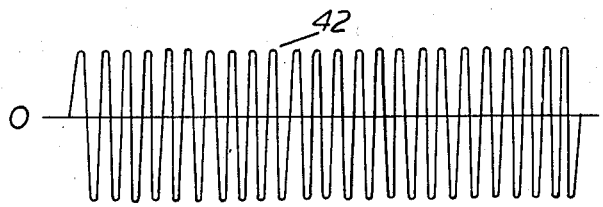
Figure 2C:
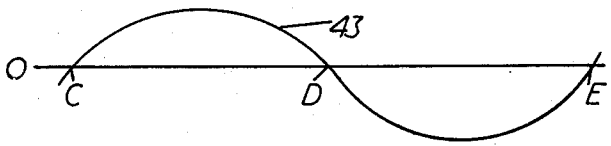
Figure 2D:
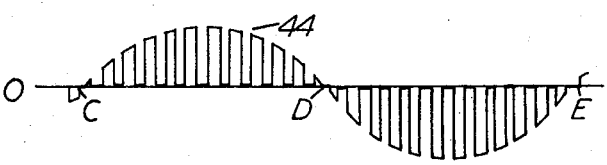
Figure 2E:
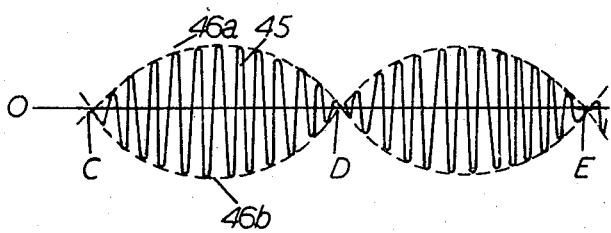
Figure 3:
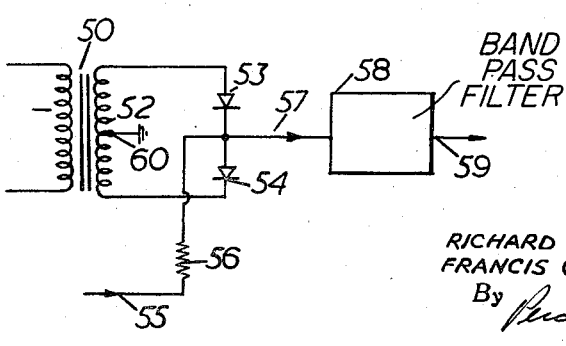

An embodiment of the invention will now be described with reference to the accompanying drawings, in which:

FIG. 1 shows in block schematic form as embodiment of the invention used in a direction finder at an airfield;

FIGS. 2a, 2b, 2c, 2d, and 2e show voltage waveforms at various points in the embodiment, and FIG. 3 shows a simplified circuit diagram of a balanced modulator used in the embodiment.

The embodiment to be described is suitable for use in a true Doppler effect radio direction finding system, such as that described in our co-pending U.S. Patent application filed July 11, 1962, Serial No. 208,986.

Referring to FIG. 1 of the accompanying drawings, there are shown two diametrically opposed dipoles 1 and 2, capable of mechanical rotation by a drive 3 driven by a motor 4. V.H.F. radio signals received by antennae 1 and 2 transferred by a rotary capacitive coupling (not shown) housed within the drive 3 to R.F. cables 5 and 6 respectively. The signals from the cable 5 are shifted by 4 kc./s. in a frequency shift arrangement 7 and are applied to one pair of input terminals of a signal combining bridge 8. The signals from the cable 6 are applied directly to a second pair of input terminals of the signal combining bridge 8. The combined signals are applied to the input of an A.M. receiver 9, from the audio output of which a 4 kc./s. frequency modulated tone is obtained.

A synchro, of the type having a single-phase rotor and a three-phase stator, is shown at 11.

Where the word "synchro" is used in this specification and claims it includes rotary variable transformers of the type in which the position of a rotor is determined by the interaction between the field generated by a number of stationary windings and that of the rotor winding.

The rotor of the synchro is rotated at the antenna rotation frequency by means of a mechanical drive 12 from the antenna drive motor 4. The motor 4 is connected to 50 c./s. supply mains via the conductor 10 and the rotor of the synchro transmitter 11 is energized from the same supply via conductor 19.

All the above-mentioned apparatus is located at the antenna site of the direction finder. The apparatus shown within the chain-dotted line 35 is located at the airfield control tower.

Electrical connection is made via conductors 13, 14 and 17 between the stator coils of the synchro 11 and the stator coils of another synchro 15 which actuates an indicator 16 via a mechanical coupling 26. Components 15, 16 and 26 form part of a bearing indicator unit 18. The bearing indicator 18 is located together with a bearing indicator drive unit 20 at the airfield control tower. The indicator drive unit 20 includes a bandpass filter 21, a limiting amplifier 22, a discriminator 23, a balanced modulator 24, and a power amplifier 25. The output of the power amplifier 25 is connected to the rotor of the receiver synchro 15 by a conductor 28. A 50 c./s. voltage, derived from the 50 c./s. mains supply, is fed to an input of the balanced modulator 24 via a conductor 31. The operation of the direction finder will now be described.

Referring to FIG. 1 of the accompanying drawings the two antennae 1 and 2 are attached to the antenna drive unit 3 which is rotated at a constant speed of 180 r.p.m. by means of the motor 4. Due to the cyclical change in the propagation path, radio frequency energy received by each of the two antennae will be frequency modulated at a modulating frequency corresponding to the antenna rotational frequency, i.e. 180/60 c./s.=3 c./s. Since the antennae 1 and 2 are diametrically opposed, the instantaneous value of the frequency deviation of the signal energy received by the two antennae will be of equal magnitude but in the opposite direction, at any instant. The maximum frequency deviation of the radio frequency energy received by each of the antennae is $\pm 5\pi$ c./s. in this embodiment. Therefore the maximum relative frequency displacement between the signals, received by the two antennae is $\pm 10\pi$ c./s.

The radio frequency energy received by the antenna 1 is conveyed by means of the radio frequency cable 5 to the frequency shift arrangement 7, in which the centre frequency of the received energy is shifted by 4 kc./s. The radio frequency energy received by the antenna 2 is conveyed by means of the radio frequency cable 6 to one pair of input terminals of the signal combining circuit 8. A second pair of input terminals of the signal combining circuit 8 is connected to the output terminals of the frequency shift arrangement 7. The output terminals of the combining circuit 8 are connected to the input terminals of an amplitude modulation receiver 9. The signal present at the input to the receiver 9 consists of the combination of the radio frequency signals received by the antennae 1 and 2, the centre frequencies of the two signals being displaced by 4 kc./s.

The two signals beat together in an A.M. detector present in the receiver 9 to produce a 4 kc./s. tone which is frequency modulated at 3 c./s., and which has a frequency deviation of $\pm 10\pi$ c./s. The operation of the direction finder as described so far has been described in greater detail in our co-pending U.S. patent application, Serial No. 208,986 mentioned above. The angle-indicating portion of the direction finding system will now be described.

The three-phase synchro 11 functions as a transmitter synchro having an A.C. energized rotor. As is well known, an A.C. output signal of the same frequency and waveform as the A.C. wave applied to the rotor may be obtained from each of the stator phases of the synchro. The amplitude of the output signal obtained from each stator phase varies in a sinusoidal manner with respect to the angular displacement of the rotor shaft from a datum position. The rotor shaft is continuously rotated at 3 c./s. by the antenna drive motor 4. The output signal wave-train obtainable from any one of the rotor phases is similar in form to that shown in FIG. 2a. The amplitude modulated sine wave 40 represents the 50 c./s. voltage induced in the stator winding by the inductive coupling between the rotor and stator windings. The dotted curves 41a and 41b represent the 3 c./s. modulation envelope of the 50 c./s. output signal. Points A, B and C correspond to angular displacements of the rotor shaft at which the inductive coupling between the rotor winding and the stator winding under observation is at a minimum. It will be noted that the phase of the 50 c./s. output signal changes by 180° as the modulation envelope goes through the zero amplitude points A, B and C. The time interval between points A and C corresponds to one cycle of the modulation envelope, that is to ⅓ second.

The waveforms of the output signal voltages derived from the other two stator phases are similar; the phases of the modulation envelope are however respectively advanced and retarded by 120° compared with the phase of the modulation envelope of the waveform shown in FIG. 2a. The 50 c./s. components of all three stator phases are either in phase or 180° out of phase with one another. At any given time the relative amplitudes of the 50 c./s. output signals from each of the stator phases of the synchro 11 is dependent upon the orientation in azimuth of the antennae 1 and 2. This is because the antennae 1 and 2 are caused to rotate by the same motor which drives the rotor of the synchro 11.

Referring to FIG. 1, each of the stator-windings of the three-phase synchro 15, located within the bearing indicator unit 18, is energized by an amount dependent upon the relative amplitude of the 50 c./s. output signal, from the particular stator phase of the synchro 11 to which it is connected; the connection being by one of the conductors 13, 14 or 17.

As mentioned earlier, a 4 kc./s. tone is obtained from the audio output of the receiver 9, the frequency of the tone being cyclically modulated within limits of $\pm 10\pi$ c./s. at a modulating frequency of 3 c./s. Speech frequency components may also be present in the audio output from the receiver 9. These are separated from the 4 kc./s. components by a band-stop filter (not shown). The 4 kc./s. frequency modulated tone is selected by the band-pass filter 21 and after selection is amplified and amplitude limited in the limiting amplifier 22. It is then demodulated in the frequency discriminator 23. A 3 c./s. sine wave is obtained from the output terminals of the frequency discriminator 23. The 3 c./s. wave may be regarded as the "signal wave" of a phase angle indicating system comprising the transmitter synchro 11 and the apparatus shown within the dotted line 35. The bearing information may be obtained by comparing the phase of this 3 c./s. "signal wave" with the phase of the "reference wave" represented by the modulation envelope of the 50 c./s. signals generated in the transmitter synchro 11 and applied to the stator of the synchro 15.

The synchro 15 functions as a receiver synchro.

The modulated 50 c./s. voltage wave applied to the stator windings of the synchro 15 can be represented mathematically by the expression $$E_1 \sin \omega t \sin pt \qquad (1)$$

where $\omega/2\pi$ c./s.$=50$ c./s. is the frequency of the A.C. voltage applied to the rotor of the transmitter synchro 11, $p/2\pi$ c./s.$=3$ c./s. is the frequency of rotation of the rotor thereof and $E_1$ is a constant which is a characteristic of the particular synchro.

If the rotor of the synchro 15 is energized with a voltage wave which can be represented mathematically by the expression:

$$E_2 \sin \omega t \sin (pt+\phi) \qquad (2)$$

where $E_2$ is the peak value of the voltage wave and $\phi$ is the phase difference between the "signal wave" and the "reference wave," then the rotor of the synchro 15 will take up an angular position (at which there is no steady displacement torque), directly proportional to the phase difference $\phi$. Each of expressions (1) and (2) correspond to the sideband terms in the expression for an amplitude modulated wave.

The 50 c./s. voltage applied to the rotor of the synchro 11 forms the "carrier wave," which is amplitude modulated at the antenna rotation frequency (3 c./s.) by the "reference wave." One method of comparing the phase of the 3 c./s. "signal wave," obtained from the output terminals of the discriminator 23, with the phase of the modulation envelope of the 50 c./s. modulated wave applied to the stator windings of the synchro 15, is therefore to modulate the amplitude of a second 50 c./s. carrier wave by the 3 c./s. "signal wave" in a balanced modulator, and apply the resultant modulated carrier wave to the rotor of the receiver synchro 15. A phase difference occurring between the two 50 c./s. carrier waves will not affect the accuracy of the phase comparison of the "signal" and "reference" waves.

In this embodiment the 3 c./s. output from the discriminator 23 is therefore applied directly to the input terminals of the balanced modulator 24. The carrier signal, consisting of a 50 c./s. voltage derived from the equipment supply mains, is fed to the modulator 24 by means of the conductor 31.

Waveforms representing the 3 c./s. modulating and 50 c./s. carrier waves applied to the modulator are shown in FIGS. 2c and 2b, respectively.

The operation of the balanced modulator 29 will now be described with reference to FIG. 3 of the accompanying drawings which shows a simplified circuit diagram of the modulator. The modulator includes a 50 c./s. input transformer 50, having a primary winding 51 and a balanced secondary winding 52 connected to ground at the point 60. Diodes 53 and 54 are connected in series across the winding 52. A conductor 55 is connected to the junction of the diodes 53 and 54 via a resistor 56. The junction of the diodes 53 and 54 is connected to the input terminals of a band-pass filter 58 via a conductor 57. A conductor 59 conveys the output from the filter 58 to the input terminals of the amplifier 25 of FIG. 1.

The 50 c./s. carrier signal is applied to the primary winding 51 of the transformer 50. The 3 c./s. modulating signal (obtained from the output terminals of the discriminator 23 of FIG. 1) is applied to the conductor 55. The resistance of the resistor 56 is made much greater than the effective impedance to ground at the junction point of the diodes 53 and 54. During positive half-cycles of the 3 c./s. signal wave, the conductor 57 will be effectively short-circuited to ground by the diode 54 during the negative half-cycles of the 50 c./s. voltage at the cathode of the diode 54. During negative half-cycles of the 3 c./s. signal wave the conductor 57 will be effectively short-circuited to ground by the diode 53 during negative half-cycles of the voltage at the cathode of the diode 54. The waveform of the signal produced at the input to the filter 58 will be as shown in FIG. 2d. The filter 58 has a pass-band which is substantially flat over the region 47–53 c./s., but the 3 c./s. component and harmonics of 50 c./s. present in the waveform shown in FIG. 2d are heavily attenuated. The waveform at the output terminals of the filter 58 is as shown in FIG. 2e, and is seen to be similar to the waveform of the output voltage wave from the stator windings of the transmitter synchro 11, shown in FIG. 2a.

The output signal from the band-pass filter 58 consists substantially of the upper and lower sideband components of frequency 53 c./s. and 47 c./s. respectively, the 50 c./s. carrier component having been effectively eliminated in the balanced modulation process. The two sideband components are amplified in the amplifier 25 (FIG. 1) which has push-pull output circuit including two power transistors operated in the class "B" condition.

The amplifier 25 includes a two-stage resistance coupled transistor pre-amplifier of which the output circuit is coupled to the input circuit of the final push-pull stage by means of a transformer. The coupling circuits used are capable of passing both the 47 c./s. and 53 c./s. components without significant relative phase shift.

The signal output from the amplifier 25 is connected via the conductor 28 to the rotor of the synchro receiver 15. When the stator and rotor windings of the synchro are energized with the appropriate signals the rotor will come to rest at an angular position which is directly proportional to the phase difference between the "reference" and "signal" waves.

The pointer 16 is mounted on the shaft 26 which is an extension of the rotor shaft of the synchro 15. The pointer comprises a disc having a slit which can be illuminated by an array of miniature lamps. A fixed circular bearing scale surrounds the pointer disc. Our co-pending U.S. Patent application filed August 24, 1962, Serial No. 219,291, describes means whereby the effective response time of the bearing indicator may be decreased and means for removing the bearing indication of the received signal disappears.

It should be emphasised that although the embodiment of the invention described forms part of a radio direction finder, the invention is not limited in its application to such arrangements. The invention may be applied to a receiver arrangement, used in connection with a radio beacon system, in which it is required to measure the phase difference between a "signal wave" and a "reference wave." In this case, the term "signal wave" refers to a bearing signal wave obtained by demodulation by the receiver of a directional radio frequency signal radiated from the beacon. The "reference wave" is obtained by demodulation on the receiver of an omni-direction signal radiated from the beacon.

The bearing signal wave, which in some systems may be of the order of 3 c./s. is to be used to modulate the amplitude of a carrier in a balanced modulator. The reference wave, which is of the same frequency as the bearing signal wave, is converted from a single phase voltage to a multi-phase voltage in a phase-splitting network, or by other means. Each phase of the reference wave is then used to modulate the amplitude of a carrier wave in a separate balanced modulator. An amplitude modulated wave is obtained from the output of each balanced modulator, the phase difference between the modulation envelopes of which is equal to the angle between the phases of the reference wave.

The multi-phase amplitude modulated waves are applied to the stator windings of a synchro receiver, and the single-phase amplitude modulated wave modulated by the bearing signal wave is applied to the rotor winding of the synchro. The rotor of the synchro will come to rest at an angular setting which is directly proportional to the phase difference between the reference and bearing signal waves. The invention is applicable to other systems in which it is required to measure the phase difference between two sinusoidal wave trains.

What we claim is:

1. A radio navigation receiver arrangement including a first modulator to modulate the amplitude of a carrier wave by a reference wave in such a way that a first amplitude modulated wave is produced substantially free from the carrier frequency component, a second modulator to modulate the amplitude of a second carrier wave of the same frequency as the first carrier wave by a bearing signal wave in such a way that a second amplitude modulated wave is produced substantially free from the carrier frequency component, circuit means to apply the first and second amplitude modulated waves to a bearing indicator responsive to the phase difference between the reference and bearing signal waves.

2. A radio direction finder including a receiver arrangement according to claim 1 in which the said first modulator includes a synchro, the rotor of which is arranged to follow the rotation of the direction finder antenna system, the winding of the said rotor being energized by the said carrier wave, the first amplitude modulated wave is obtained from the stator windings of the synchro, the said second modulator includes a balanced modulator, the said bearing indicator includes a second synchro, a connection is provided to the stator windings of the second synchro for the first amplitude modulated wave, and a connection is provided to the rotor winding of the second synchro for the said second amplitude modulated wave.

3. A radio beacon including a receiver arrangement according to claim 1 in which the said second modulator includes a balanced modulator, the said bearing indicator includes a synchro, a connection is provided to the stator windings of the synchro for the said first amplitude modulated wave and a connection is provided to the rotor winding of the synchro for the second amplitude modulated wave.

References Cited in the file of this patent

UNITED STATES PATENTS 2,481,509    Hansel _____ Sept. 13, 1949